(12) United States Patent
Chelba et al.

(10) Patent No.: US 7,624,006 B2
(45) Date of Patent: Nov. 24, 2009

(54) CONDITIONAL MAXIMUM LIKELIHOOD ESTIMATION OF NAÏVE BAYES PROBABILITY MODELS

(75) Inventors: Ciprian Chelba, Seattle, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 10/941,399

(22) Filed: Sep. 15, 2004

(65) Prior Publication Data

US 2006/0074630 A1 Apr. 6, 2006

(51) Int. Cl.
G06F 17/27 (2006.01)
G06F 17/20 (2006.01)
G06F 17/30 (2006.01)

(52) U.S. Cl. .................. 704/9; 704/1; 707/6
(58) Field of Classification Search .......... None
See application file for complete search history.

(56) References Cited

U.S. PATENT DOCUMENTS

2004/0148154 A1* 7/2004 Acero et al. ............. 704/1
2004/0260677 A1* 12/2004 Malpani et al. ............ 707/3

OTHER PUBLICATIONS

J. Chu-Carroll and B. Carpenter, "Vector-based natural language call routing," *Computational Linguistics*, vol. 25, No. 3, pp. 361-388, 1999.

A. L. Berger, S. A. Della Pietra, and V. J. Della Pietra, "A maximum entropy approach to natural language processing," *Computational Linguistics*, vol. 22, No. 1, pp. 39-72, Mar. 1996.
P.S. Gopalakrishnan et al., "An inequality for rational functions with applications to some statistical estimation problems," *IEEE Transactions on Information Theory*, vol. 37, No. 1, pp. 107-113, Jan. 1991.
F. Jelinek and R. Mercer, "Interpolated estimation of Markov souce parameters from sparse data," in *Pattern Recognition in Practice*, E. Gelsema nad L. Kanal, Eds., pp. 381-397, 1980.
S.F. Chen and R. Rosenfeld, "A Gaussian Prior for Smoothing Maximum Entropy Models," *IEEE Transactions on Speech and Audio Processing*, vol. 8, No. 1, pp. 37-50, 2000.
D. Pallet et al., "1993 benchmark tests fro the ARPA spoken language program," in *Proceedings of the Human Language Technology Workshop*, C.J. Weinstein, Ed. Morgan Kaufmann, Plainsboro, NJ, Mar. 1994.
S. Young, "The HTK hidden Markov model toolkit: design and philosophy," Tech. Rep. TR. 153, Department of Engineering, Cambridge University, UK, 1993.

(Continued)

*Primary Examiner*—David R Hudspeth
*Assistant Examiner*—Samuel G Neway
(74) *Attorney, Agent, or Firm*—Steven M. Koehler; Westman, Champlin & Kelly, P.A.

(57) ABSTRACT

A statistical classifier is constructed by estimating Naïve Bayes classifiers such that the conditional likelihood of class given word sequence is maximized. The classifier is constructed using a rational function growth transform implemented for Naïve Bayes classifiers. The estimation method tunes the model parameters jointly for all classes such that the classifier discriminates between the correct class and the incorrect ones for a given training sentence or utterance. Optional parameter smoothing and/or convergence speedup can be used to improve model performance. The classifier can be integrated into a speech utterance classification system or other natural language processing system.

18 Claims, 8 Drawing Sheets

OTHER PUBLICATIONS

Speech utterance classification, Chelba, C. Mahajan, M. Acero, A., Microsoft Corp., Redmond, WA, USA; This paper appears in: *Acoustics, Speech, and Signal Processing, 2003. Proceedings. (ICASSP '03). 2003 IEEE International Conference on* Publication Date: Apr. 6-10 2003, vol. 1, On pp. I-280-I-283 vol. 1.

Conditional Maximum Likelihood Estimation using Rational Function Growth Transform: abstract submitted to the Snowbird Learning Workshop (Utah, Apr. 6-9, 2004).

Conditional Maximum Likelihood Estimation of Naïve Bayes Probability Models Using Rational Function Growth Transform Ciprian Chelba and Alex Acero, Apr. 5, 2004, Technical Report MSR-TR-2004-33, Microsoft Corporation.

A.L. Gorin, G. Ricardi, and J.H. Wright, "How may I help you?, " *Speech Communication*, vol. 23, No. 1/2, pp. 113-127, 1997.

Christopher D. Manning and Hinrich Schutze, *Foundations of Statistical Natural Language Processing*, The MIT Press, Cambridge, Massachusetts, 2001.

Richard O. Duda, Peter E. Hart, and David G. Stork, *Pattern Classification*, John Wiley and Sons, Inc., second edition, 2001.

A.L. Gorin, G. Ricardi, and J.H. Wright, "How may I help you?," *Speech Communication*, vol. 23, No. 1/2, pp. 113-127, 1997.

* cited by examiner

CONDITIONAL MAXIMUM LIKELIHOOD ESTIMATION OF NAÏVE BAYES PROBABILITY MODELS

BACKGROUND OF THE INVENTION

The present invention relates to training classifiers. In particular, the present invention relates to training classifiers to classify natural language text.

Speech utterance classification as well as text classification are well-defined problems in a growing trend of providing natural language user interfaces to automated systems. A few applications among many others are call-routing for automated call centers, natural language based help systems, or application interfaces.

For example, suppose a prospective traveler wishes to access a travel information system. Such a traveler provides a spoken or written query such as, "Show me all the flights from Seattle to DC this month." The travel reservation system then attempts to classify the query into a finite number of possible classes such as flight information, ground transportation information, hotel information, special meal requests, etc. for routing to an appropriate customer service representative.

In another situation, a computerized help desk receives emails and/or telephone calls from employees such as "How do I enable voting buttons on my email?" or "My hard drive died." Such a computerized help desk classifies the incoming emails and/or telephone calls into a number of possible classes such as email, operating systems, printer connectivity, web browsing, and remote access problems in order to route the communications to an appropriate technician.

A statistical classification approach (e.g. n-gram, Naïve Bayes, and maximum entropy) to the problem is common and the most successful one used so far since it deals gracefully with the irregularities of natural language and can usually be estimated in a data-driven fashion, without expensive human authoring.

One such state-of-the-art statistical approach is the Naïve Bayes classifier, whereby a sentence or sequence of words is classified as belonging to one of a number of classes. The model relies on parameters whose values need to be estimated from annotated training data in order to assign a probability to a given sequence of words or sentence. Standard methods of estimating Naïve Bayes classifiers include using maximum likelihood techniques, which estimate the model parameters for each class independently.

In the speech utterance classification process, it is possible to use a two-pass system where, in a first pass, speech input is converted to text, such as with a conventional speech recognizer. Then in a second pass, the text is classified into a class or category. However, it is also possible to use a one-pass classification system where input speech is directly classified.

Generally, different approaches (e.g. n-gram, Naïve Bayes, and maximum entropy) are used for one pass and two pass classification systems. Approaches used in one-pass systems can generally also be used in a two-pass system. However, the converse is not true: approaches that are used in a two-pass system do not necessarily work in a one-pass system. The Naïve Bayes approach is generally used for two-pass systems.

An improved method of speech utterances and text classification in automated systems having natural language user interfaces would have significant utility.

SUMMARY OF THE INVENTION

The present invention relates to classifying speech and text input received on a natural language interface using a statistical classifier. The statistical classifier is constructed using an algorithm for iteratively estimating Naïve Bayes classifiers such that the conditional likelihood of class given word sequence is maximized. The estimation method tunes the model parameters jointly for all classes such that the classifier discriminates between the correct class and the incorrect ones for a given training sentence or utterance. The method employs a rational function growth transform implemented for Naïve Bayes classifiers. In some embodiments parameter smoothing is used to improve model performance. In other embodiments, a simple modification increases convergence speed (as measured by improvement in likelihood and classification accuracy per number of training iterations) over a straightforward implementation of the present algorithm. In still other embodiment, both smoothing and speed-up are used to improve model performance with faster convergence.

DETAILED DESCRIPTION OF ILLUSTRATIVE EMBODIMENTS

Before describing aspects of the present invention, it may be useful to provide a brief description of a suitable computing system environment 100 (FIG. 1) on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purposes or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

Figure 1:
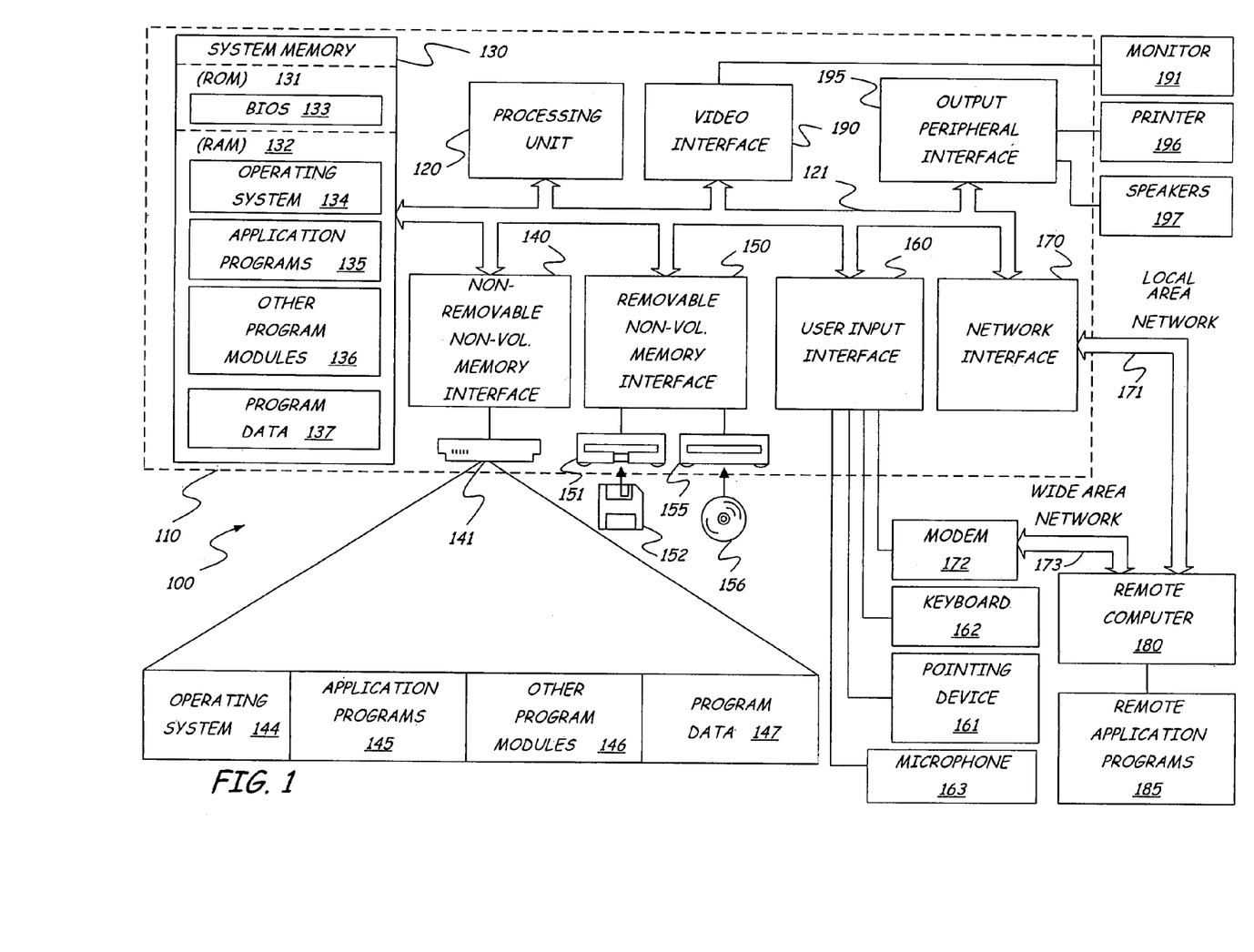
FIG. 1 is a block diagram of a general computing environment in which the present inventions can be practiced.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also can represent input provided through a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
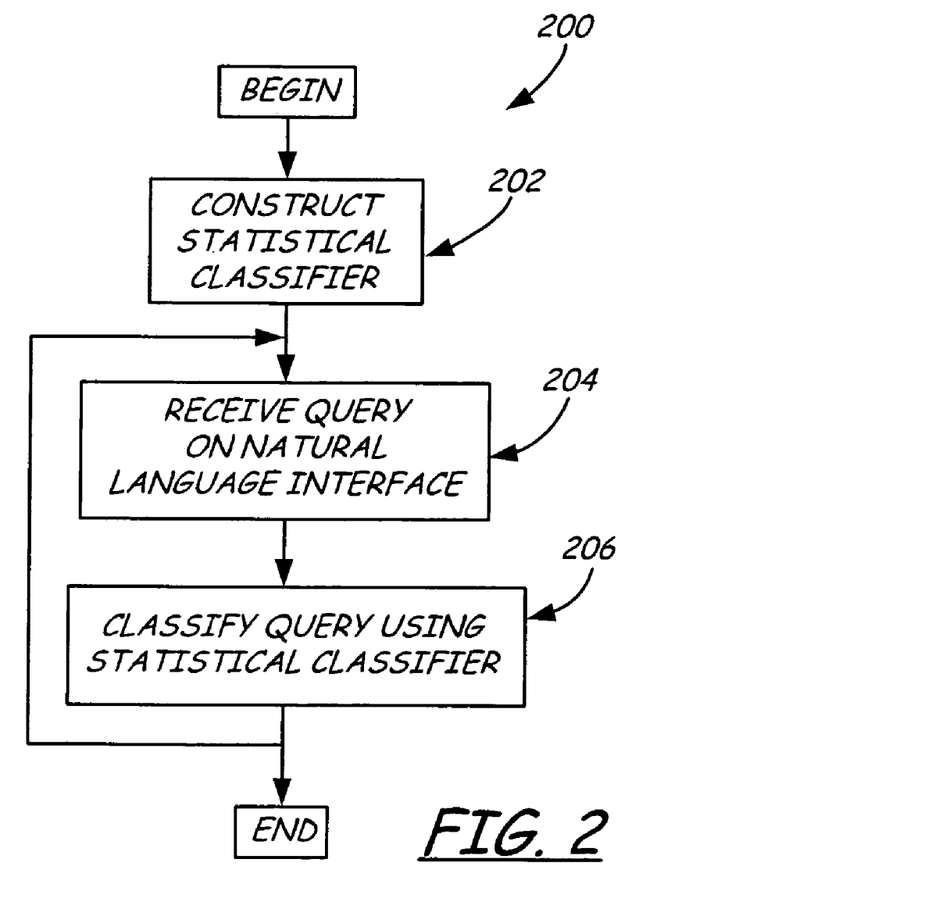
FIG. 2 is a flow diagram illustrating two broad aspects of the present inventions.

FIG. 2 is an overview flow diagram showing two broad aspects of the present invention embodied as a single method 200. In a first aspect, FIG. 2 illustrates step 202 of constructing a statistical classifier or model, used later for natural language classification. In a second aspect, FIG. 2 illustrates step 206 of classifying queries or requests received through an interface at step 204 using the statistical model.

Figure 3:
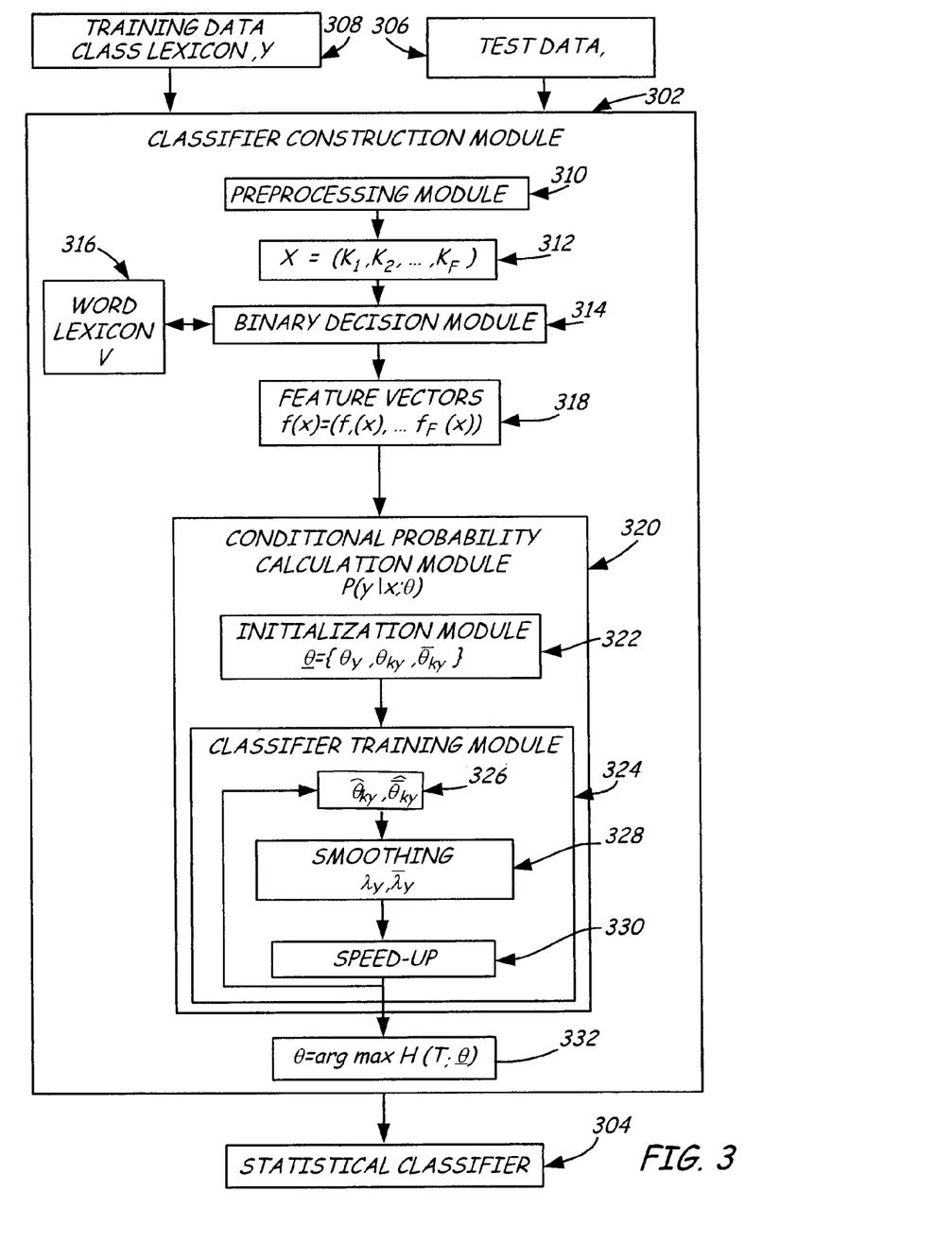
FIG. 3 is a block diagram of a system for constructing a statistical classifier in accordance with embodiments of the present invention.
Figure 4:
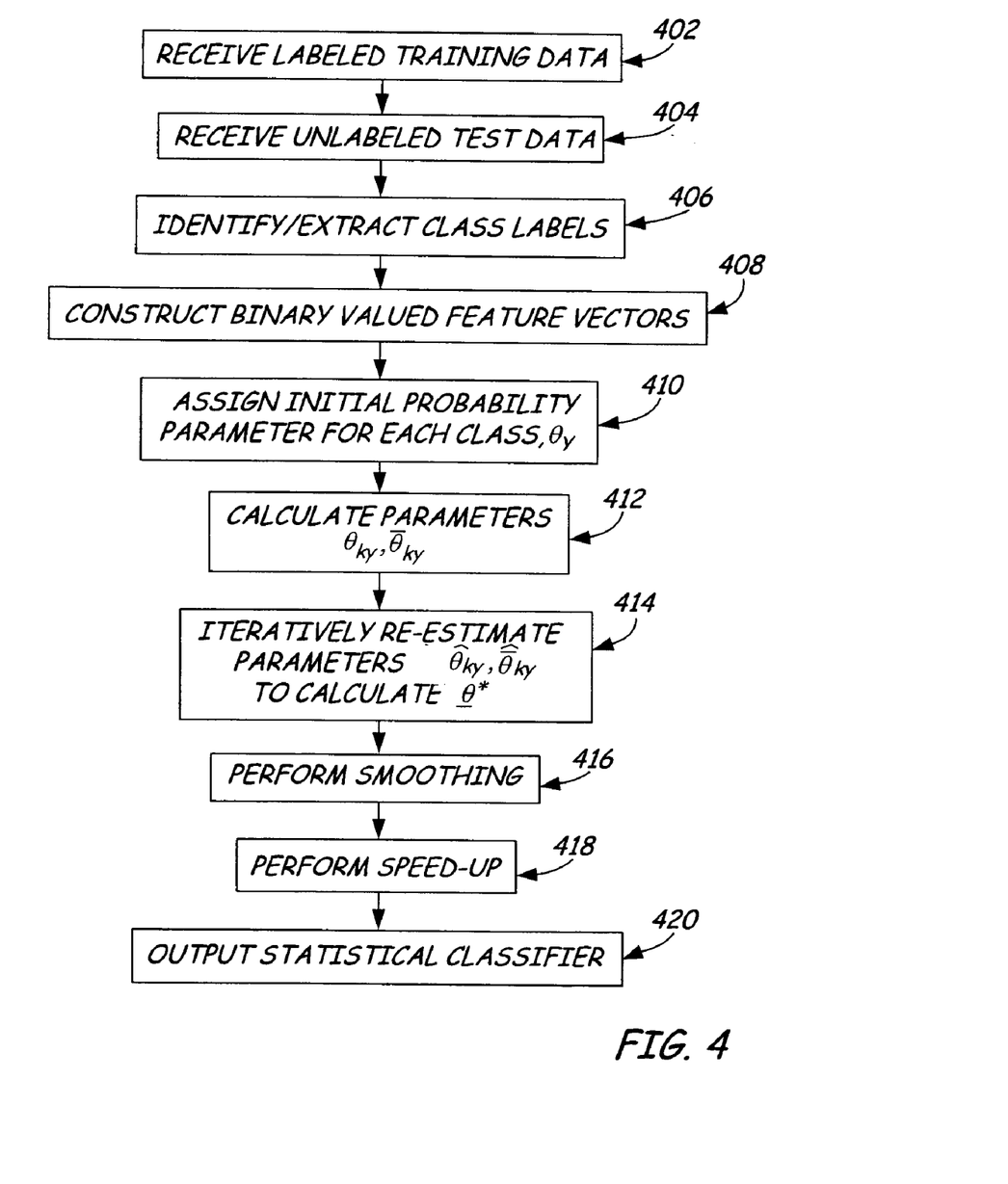
FIG. 4 illustrates a method of constructing a statistical classifier in accordance with the present inventions.

FIG. 3 is a block diagram illustrating classifier construction module 302, which performs step 202 illustrated in FIG. 2. FIG. 4 illustrates a method implementing classifier construction module 302. Classifier construction module 302 can be an application program 135 executed on computer 110 or stored and executed on any of the remote computers in the LAN 171 or the WAN 173 connections. Likewise, statistical classifier 304 can reside on computer 110 in any of the local storage devices, such as hard disk drive 141, or on an optical CD, or remotely in the LAN 171 or the WAN 173 memory devices. It should be further noted that the modules and processing steps herein illustrated are provided primarily for understanding and that the modules and processing steps can be combined or changed in other embodiments.

At steps 402, classifier construction module 302 receives labeled training data 308, respectively, from any of the input devices described above as well as from any of the data storage devices described above. Training data 308 can comprise past queries received through an interface such as the travel information system or computer help desk discussed above. Training data 308 has been classified in selected classes each having a particular class label. For example, in an experiment performed using an Airline Travel Information System (ATIS), user queries were classified in the following 14 classes: FLIGHT; FARE; GROUND SERVICE; AIRLINE; AIRCRAFT; AIRPORT; FARE BASIS; AIRPORT SERVICE; CITY; FOOD SERVICE; CLASS OF SERVICE; RESTRICTION; DAYS; and FLIGHT STOP. At step 404, classifier construction module receives unlabeled test data 306 from any of the input devices or storage devices described above. Unlabeled test data 306 can comprise past queries received through an interface such as the ATIS system or computer help desk discussed above.

At step 406, the classes labels, which form a class vocabulary or lexicon, are extracted or identified. In other words, class vocabulary, Y, can be expressed as $Y=\{y_1, y_2 \ldots y_N\}$ where $y_1, y_2, \ldots, y_N$ are classes or class labels, and N is the number of classes. In some embodiments, class labels are obtained from Structured Query Language (SQL) queries that often accompany query sentences. It is noted that SQL is used in modern database architecture to define methods used to create and manipulate relational databases across platforms.

Classifier construction module 302 can optionally comprise pre-processing module 310. Pre-processing module 310 can process natural language data 306, 308, for example, by maintaining only high content words. In addition, pre-processing module 310 can perform word stemming, which is a process of removing morphological variations in words to obtain their root forms. Examples of morphological variations include inflectional changes (such as pluralization, verb tense, etc.) and derivational changes that alter a word's grammatical role (such as adjective versus adverb as in "slow" versus "slowly," etc.). Pre-processing module 310 can comprise a word breaker, which identifies individual words in received text. For text in segmented languages such as English, word breaker 310 can distinguish words from other grammatical features such as commas. For text in unsegmented languages, such as Chinese or Japanese, word breaker 310 can comprise or be coupled to a parser (not shown) that segments the unsegmented language into words. Optional pre-processing module 310 processes sentences $x_i$, $i=1, 2, \ldots, T$ where T is the number of sentences in the training data or set 308.

Conditional Probability

In constructing statistical classifier 304, the conditional probability of a class y, given a sentence x is modeled, which can be expressed with the following equation:

$$P(y|x), y \in Y, x \in X,$$

where Y is the vocabulary or set of N classes and X is the set of sentences in the training data 308. A set of features, i.e. lexicon or vocabulary 316 of words deemed relevant to building the model is identified. Since the present conditional probability model relies on the Naïve Bayes assumption, the features whose support is included in X are of primary focus. These features can be expressed as the binary valued indicator function $f(x):X \rightarrow \{0,1\}$. Let $F=\{f_k, k=1, \ldots, F\}$ be the set of features chosen for building a particular model $P(y|x)$ where x indicates individual sentences, k indicates words in lexicon 316, and F indicates the total number of words in lexicon 316.

At step 408, for given events (x,y) in training data 308, binary decision module 314 accesses word lexicon 316 to determine whether words $x(1), \ldots x(L)$, where L is the number of words in sentence x, are in lexicon 316. Words not in lexicon are mapped to a special UNKNOWN word. Lexicon 316 can be an existing lexicon for a particular application. During processing, binary decision module 314 assigns a feature value of 1 for words in the lexicon that are present in sentence x, while binary decision module assigns a feature value of 0 for words in the lexicon that are absent from sentence x. Binary decision module 314 then constructs a set of binary valued feature vector 318 that lists the values of each feature, for any given sentence x:

$$\underline{f}(x)=(f_1(x), \ldots, f_F(x)).$$

Assuming a Naïve Bayes model for the feature vector and the predicted variable ($\underline{f}(x),y$), the joint probability of $\underline{f}(x)$ and $y$ can be expressed as follows:

$$P(\underline{f}(x), y) = \theta_y \prod_{k=1}^{F} \theta_{ky}^{f_k(x)} \overline{\theta}_{ky}^{\overline{f_k(x)}}$$

where $\overline{f_i(x)} = 1 - f_i(x)$.

Conditional probability calculation module 320 calculates conditional probability of class y given a sentence x and set of parameters $\underline{\theta}$, which can be expressed as follows:

$$P(y|x; \underline{\theta}) = Z(x; \underline{\theta})^{-1} \cdot \theta_y \prod_{k=1}^{F} \theta_{ky}^{f_k(x)} \overline{\theta}_{ky}^{\overline{f_k(x)}} \qquad \text{Eq. 1}$$

where $$\theta_y \geq 0, \forall y \in Y, \sum_{y \in Y} \theta_y = 1$$

$$\theta_{ky} \geq 0, \overline{\theta}_{ky} \geq 0, \theta_{ky} + \overline{\theta}_{ky} = 1, \forall k = \overline{1, F}, y \in Y$$

$$Z(x; \theta)^{-1} = \sum_y P(\underline{f}(x), y).$$

At step 410, initialization module 322 calculates an initial probability $\theta_y$ for each class from training data 308. For example, in the computer help desk example discussed above, most queries or approximately 80% can be related to operating system issues. In the ATIS system example, most user queries (over 70%) can be related to flight information.

At step 412, initialization module 320 calculates parameters $\theta_{ky}$ and $\overline{f}_{ky} = (1 - \theta_{ky})$ values from training data 308. The value $\theta_{ky}$ represents the probability that word k is in class y, while the value of $(1 - \theta_{ky})$ or $\overline{\theta}_{ky}$ represents the probability the word k is not in class y or improbability that word k is in class y. Both $\theta_y$ and $\theta_{ky}$ should be properly normalized.

It should also be noted that $P(x,y) = P(\underline{f}(x),y)$ does not result in a proper probability model since different $(x,y)$ values may map to the same $\underline{f}(x),y$ value. Also, since the model uses one free parameter $\theta_{ky}$ for each different $y \in Y$, the model can be represented equivalently using the usual $f_k(x,y) = f_k(x) \cdot \delta(y)$ features encountered in maximum entropy/log-linear modeling.

Relationship with Log-Linear Models

A simple re-parameterization of the conditional model presented above results in a log-linear model. First it is noted that $$P(\underline{f}(x), y) = \theta_y \cdot \prod_{k=1}^{F} \theta_{ky}^{f_k(x)} \overline{\theta}_{ky}^{\overline{f_k(x)}}$$

can be rewritten as follows:

$$P(\underline{f}(x), y) = \theta_y \cdot \prod_{k=1}^{F} \overline{\theta}_{ky} \cdot \prod_{k=1}^{F} \left[ \frac{\theta_{ky}}{\overline{\theta}_{ky}} \right]^{f_k(x)}.$$

If the following settings are made:

$$f_k(x, y) = f_k(x) \cdot \delta(y)$$

$$\lambda_{ky} = \log\left(\frac{\theta_{ky}}{\overline{\theta}_{ky}}\right)$$

$$\lambda_{0y} = \log\left(\theta_y \cdot \prod_{k=1}^{F} \overline{\theta}_{ky}\right)$$

$$f_0(x, y) = f_0(y)$$

then the conditional probability can be expressed as follows:

$$P(y|x; \underline{\lambda}) = Z(x; \underline{\lambda})^{-1} \cdot \exp\left(\sum_{k=0}^{F} \lambda_{ky} f_k(x, y)\right), \qquad \text{Eq. 2}$$

which is also a log-linear model such as used in a maximum entropy probability estimation. Consequently, the parameter estimation procedure discussed below is applicable to this particular class of log-linear models as well, resulting in an alternative to existing estimation techniques employed for log-linear models.

Conditional Maximum Likelihood Estimation of Naïve Bayes Models

It is desirable to estimate the model parameters $\underline{\theta} = \{\theta_y, \theta_{ky}, \overline{\theta}_{ky}, \forall y,k\}$ such that the conditional likelihood $$H(T; \underline{\theta}) = \prod_{j=1}^{T} P(y_j|x_j)$$

assigned by the present model to a set of training data or samples 308 $T = \{(x_1, y_1), \ldots, (x_T, y_T)\}$ is maximized. Conditional probability calculation module 320 comprises classifier training module 324, which iteratively maximizes the $\underline{\theta}$ value as indicated at 332, which can be expressed as follows:

$$\underline{\theta}^* = \operatorname*{argmax}_{\underline{\theta}} H(T; \underline{\theta}). \qquad \text{Eq. 3}$$

It is noted that $H(T;\underline{\theta})$ is a ratio of two polynomials with real coefficients, each defined over a set x of probability distributions:

$$x = \Big\{ \underline{\theta} : \theta_y \geq 0, \forall y \in Y \text{ and } \sum_y \theta_y = 1;$$

$$\theta_{ky} \geq 0 \text{ and } \theta_{ky} + \overline{\theta}_{ky} = 1, \forall y \in Y, \forall k = 1, \ldots, F \Big\}.$$

At step 414, classifier training module 324 iteratively re-estimates model parameters indicated at 326 using a growth transform for rational functions on the domain x. The re-estimation equations representing re-estimated parameters can be expressed as follows:

$$\hat{\theta}_y = N^{-1}\theta_y\left(\frac{\partial \log H(T;\underline{\theta})}{\partial \theta_y} + C_{\underline{\theta}}\right) \quad \text{Eq. 4}$$

$$N = C_{\underline{\theta}} + \sum_y \theta_y \frac{\partial \log H(T;\underline{\theta})}{\partial \theta_y}$$

$$\hat{\theta}_{ky} = N_y^{-1}\theta_{ky}\left(\frac{\partial \log H(T;\underline{\theta})}{\partial \theta_{ky}} + C_{\underline{\theta}}\right) \quad \text{Eq. 5}$$

$$\hat{\overline{\theta}}_{ky} = N_y^{-1}\overline{\theta}_{ky}\left(\frac{\partial \log H(T;\underline{\theta})}{\partial \overline{\theta}_{ky}} + C_{\underline{\theta}}\right)$$

$$N_y = C_{\underline{\theta}} + \theta_{ky}\frac{\partial \log H(T;\underline{\theta})}{\partial \theta_{ky}} + \overline{\theta}_{ky}\frac{\partial \log H(T;\underline{\theta})}{\partial \overline{\theta}_{ky}}$$

where $C_\theta > 0$ is chosen such that:

$$\frac{\partial \log H(T;\underline{\theta})}{\partial \theta_y} + C_{\underline{\theta}} > \varepsilon, \forall\, y \quad \text{Eq. 6}$$

$$\frac{\partial \log H(T;\underline{\theta})}{\partial \theta_{ky}} + C_{\underline{\theta}} > \varepsilon, \forall\, k, y$$

$$\frac{\partial \log H(T;\underline{\theta})}{\partial \overline{\theta}_{ky}} + C_{\underline{\theta}} > \varepsilon, \forall\, k, y$$

with $\epsilon > 0$ suitably chosen as described in "An Inequality for Rational Functions with Applications to some Statistical Estimation Problems," by P. S. Gopalakrishnan, Dimitri Kanevski, Arthur Nadas, and David Nahamoo, IEEE Transactions of Information Theory, vol. 37, no. 1, pp. 107-113, January 1991 herein incorporated by reference in its entirety.

One advantage of the growth transform re-estimation procedure is that the present model parameters are re-normalized or tuned at each iteration, thus maintaining parameters in the parameter space X.

Smoothing and Initialization

At step 416, optional smoothing indicated at 326 can be used to improve performance of the present model. Model parameters $\underline{\theta}$ are initialized using maximum likelihood estimates and smoothed using MAP, which can be expressed as follows:

$$\theta_y = \frac{\sum_{i=1}^T \delta(y, y_i) + \alpha\frac{1}{|y|}}{T + \alpha} \quad \text{Eq. 7}$$

$$\theta_{ky} = \frac{\sum_{i=1}^T f_k(x_i)\delta(y, y_1) + \alpha\frac{1}{2}}{\sum_{i=1}^T \delta(y, y_i) + \alpha} \quad \text{Eq. 8}$$

$$\overline{\theta}_{ky} = \frac{\sum_{i=1}^T \overline{f_k(x_i)}\delta(y, y_i) + \alpha\frac{1}{2}}{\sum_{i=1}^T \sigma(y, y_i) + \alpha}$$

The optimal value for the MAP weight $\alpha$ is determined such that $\alpha$ maximizes classification accuracy on cross validation data.

The optional smoothing scheme is implemented during re-estimation of model parameters. It is noted that Eq. 8 can be equivalently written as linear interpolation between the relative frequency estimate for $\theta_{ky}, \overline{\theta}_{ky}$ and the uniform distribution $$\left(\frac{1}{2}\right).$$

Assuming that counts of various events are denoted by #( ), Eq. 8 can be rewritten as follows:

$$\theta_{ky} = \lambda_y \cdot \frac{\#(k, y)}{\#(y)} + \overline{\lambda}_y \cdot \frac{1}{2} \quad \text{Eq. 9}$$

$$\lambda_y = \frac{\#(y)}{\#(y) + \alpha}$$

$$\overline{\lambda}_y = \frac{\alpha}{\#(y) + \alpha}$$

where the values of $\lambda_y$ and $\overline{\lambda}_y$ are interpolation weights and depend on the count of class y.

When $\theta_{ky}$ in Eq. 9 is substituted back into Eq. 1, parameterized conditional probability with smoothing can be expressed as follows:

$$P(y|x;\underline{\theta}) = \quad \text{Eq. 10}$$

$$Z(x;\underline{\theta})^{-1} \cdot \theta_y \prod_{k=1}^{F} \left(\lambda_y \cdot \theta_{ky} + \overline{\lambda}_y \cdot \frac{1}{2}\right)^{f_k(x)} \left(\lambda_y \cdot \overline{\theta}_{ky} + \overline{\lambda}_y \cdot \frac{1}{2}\right)^{\overline{f_k(x)}}$$

where $$\theta_y \geq 0,\, \forall\, y \in y,\, \sum_{y \in Y} \theta_y = 1;$$

$$\theta_{ky} \geq 0,\, \overline{\theta}_{ky} \geq 0,\, \theta_{ky} + \overline{\theta}_{ky} = 1,\, \forall\, k = \overline{1, F},\, y \in Y;$$

$$\lambda_y \geq 0,\, \overline{\lambda}_y \geq 0,\, \lambda_y + \overline{\lambda}_y = 1,\, \forall\, y \in Y;$$

$$Z(x,\underline{\theta})^{-1} = \sum_y P(\underline{f}(x), y)$$

It is noted that under the parameterization for P(y|x) in Eq. 10, the conditional likelihood $$H(T;\underline{\theta}) = \Pi_{j=1}^T P(y_j|x_j)$$

is still a ratio of polynomials as required by Gopalaakrishnan (1991) referenced above.

Model Parameter Updates

Calculating the partial derivatives in Eq. 5 above results in the following parameter values:

$$\hat{\theta}_{ky} = N_{ky}^{-1} \cdot \theta_{ky} \cdot \quad \text{Eq. 11}$$

$$\left\{1 + \beta_{\underline{\theta}} \frac{\lambda_y}{\lambda_y \cdot \theta_{ky} + \overline{\lambda}_y \cdot \frac{1}{2}} \sum_{i=1}^T f_k(x_i)[\delta(y, y_i) - p(y|x_i;\underline{\theta})]\right\}$$

-continued $$\hat{\theta}_{ky} = N_{ky}^{-1} \cdot \theta_{ky} \cdot$$

$$\left\{1 + \beta_{\underline{\theta}} \frac{\lambda_y}{\lambda_y \cdot \theta_{ky} + \overline{\lambda_y} \cdot \frac{1}{2}} \sum_{i=1}^{T} \overline{f_k(x_i)}[\delta(y, y_i) - p(y|x_i; \underline{\theta})]\right\}$$

where $N_{ky}^{-1}$ is a normalization constant that ensures that $\hat{\theta}_{ky}$+ $\hat{\overline{\theta}}_{ky}$=1, $\beta_{\underline{\theta}}$=1/$C_{\underline{\theta}}$ where $B_{\underline{\theta}}$ is set for every iteration, and $\delta(\ )$ is the Kronecker delta operator, $\delta(y,y_1)$=1 for y=$y_1$ and 0 otherwise.

Model Parameter Initialization

The $\theta_k$ and $\theta_{ky}$ parameters are initialized to their maximum likelihood values (relative frequency) and smoothed using MAP, as explained previously. The MAP weight $\alpha$, common for all classes y, is calculated by a line search such that the conditional likelihood on cross-validation data is maximized. The resulting interpolation weight $\lambda_y$ for each class y is fixed to the value determined using Eq. 9. It is noted that only the $\theta_{ky}$ and $\overline{\theta}_{ky}$ are re-estimated using the rational function growth transform (RFGT). The interpolation weight $\lambda_y$ and class prior $\theta_y$ are not re-estimated since model performance is not very sensitive to their values.

Other Refinements

The choice of $\beta_{\underline{\theta}}$=1/$C_\theta$ where $C_\theta$ satisfies Eq. 6 can be problematic. First, the correct value of $\epsilon$ that will ensure monotonic increase in conditional likelihood H(T;$\underline{\theta}$) is relatively difficult to determine. Large values for $\epsilon$ will slow down convergence whereas small values may result in non-monotonic increase of the conditional likelihood. Second, assuming that $\beta_\theta$ is chosen such that Eq. 6 is satisfied for a small non-negative value of $\epsilon$, the value of $\beta_\theta$ can still be very small.

It has been observed that there exists a pair of (k,y) values that require a very small $\beta_\theta$ value, which makes the updates for other (k,y) pairs very small, and consequently, slows down convergence. However, different $\beta_\theta$ values can be used for different probability distributions in x, which can be expressed as $\beta_\theta$=$\beta_\theta$(k,y). Thus, $\beta_\theta$ values become sensitive to the particular (k,y) values as described in greater detail below.

Dependency of Training Data Size

Since the above equations typically extend over the entire training data, it can be useful to normalize $\beta_{\underline{\theta}}$ with respect to training data size. Thus, $$\beta_{\underline{\theta}} = \frac{\gamma_{\underline{\theta}}}{T}$$

can be used in Eq. 11 where T represents training data size.

Convergence Speed-Up and Class Count

At step 418, optional convergence speed-up indicated at can be performed. It is noted that the update of Eqs. 11 could be made dimensionally correct if the following expression:

$$\beta_{\underline{\theta}} \cdot \sum_{i=1}^{T} f_k(x_i)[\delta(y, y_i) - p(y|x_i; \underline{\theta})]$$

has the dimension of probability $\theta_{ky}$. This is achieved by substituting $$\beta_{\underline{\theta}} = \frac{\varsigma_{\underline{\theta}}(y)}{\#(y)}.$$

During experiments, it was discovered that this parameterization results in a considerable convergence speedup.

It is noted that setting $$\varsigma_{\underline{\theta}} = \frac{\#(y)}{T} \cdot \gamma_{\underline{\theta}}$$

would result in the exact same update equations under either the $\gamma$ or the $\zeta$ updates. Since $$\frac{\#(y)}{T} = \theta_y < 1.0 \forall\ y,$$

the speed-up observed in practice can thus be partly attributed to using a higher step-size in the $\zeta$-based updates. However, in experimental setup the prior distribution $$\theta_y = \frac{\#(y)}{T}$$

is usually highly skewed towards one particular class. For example, with the computer help desk approximately 80% of requests related to operating system problems. For the travel information system discussed above, approximately 74% of queries were related to flight information. Therefore, it is believed that not all the convergence speed improvement comes from the difference in step-size although a direct comparison of the relative performance of the two parameter update equations is difficult.

Choosing $\gamma_{\underline{\theta}}$ and $\zeta_{\underline{\theta}}$

A separate value $\gamma_{\underline{\theta}}$ can be used for each probability distribution in x. Determining $\gamma_{\underline{\theta}}$(k,y) includes the following steps:

For each pair (k,y):
  Set $\gamma_{\underline{\theta}}$(k,y)=$\gamma_{min}$
  For the (k,y) values where the previous choice does not meet Ineq. 6, set $\gamma_\theta$(k,y) lower so that there is equality in Ineq. 6.
  $\forall$(k,y) set $\gamma_\theta$(k,y)=(1−$e^{-7}$)·$\gamma_\theta$(k,y) such that the margin by which the (k,y) pairs satisfy Ineq. 6 for $\epsilon$=0 is increased. It is noted that choosing $\epsilon$=0 or very small doesn't guarantee monotonic increase of the conditional log-likelihood on training data as confirmed by experiments.

The value $\gamma_{min}$ as well as the number of re-estimation iterations are chosen such that they maximize classification accuracy on cross validation data. A similar procedure is followed in the case of parameter updates based on $\xi_\theta$.

At step 420, classifier construction module outputs statistical classifier 304 using one or more of the methods or approaches described above. For example, classifier training module 324 can employ smoothing indicated at 328, speedup indicated at 330, both smoothing and speedup, or neither smoothing or speedup to construct statistical classifer 304.

Overview of Task Classification System

Figure 5:
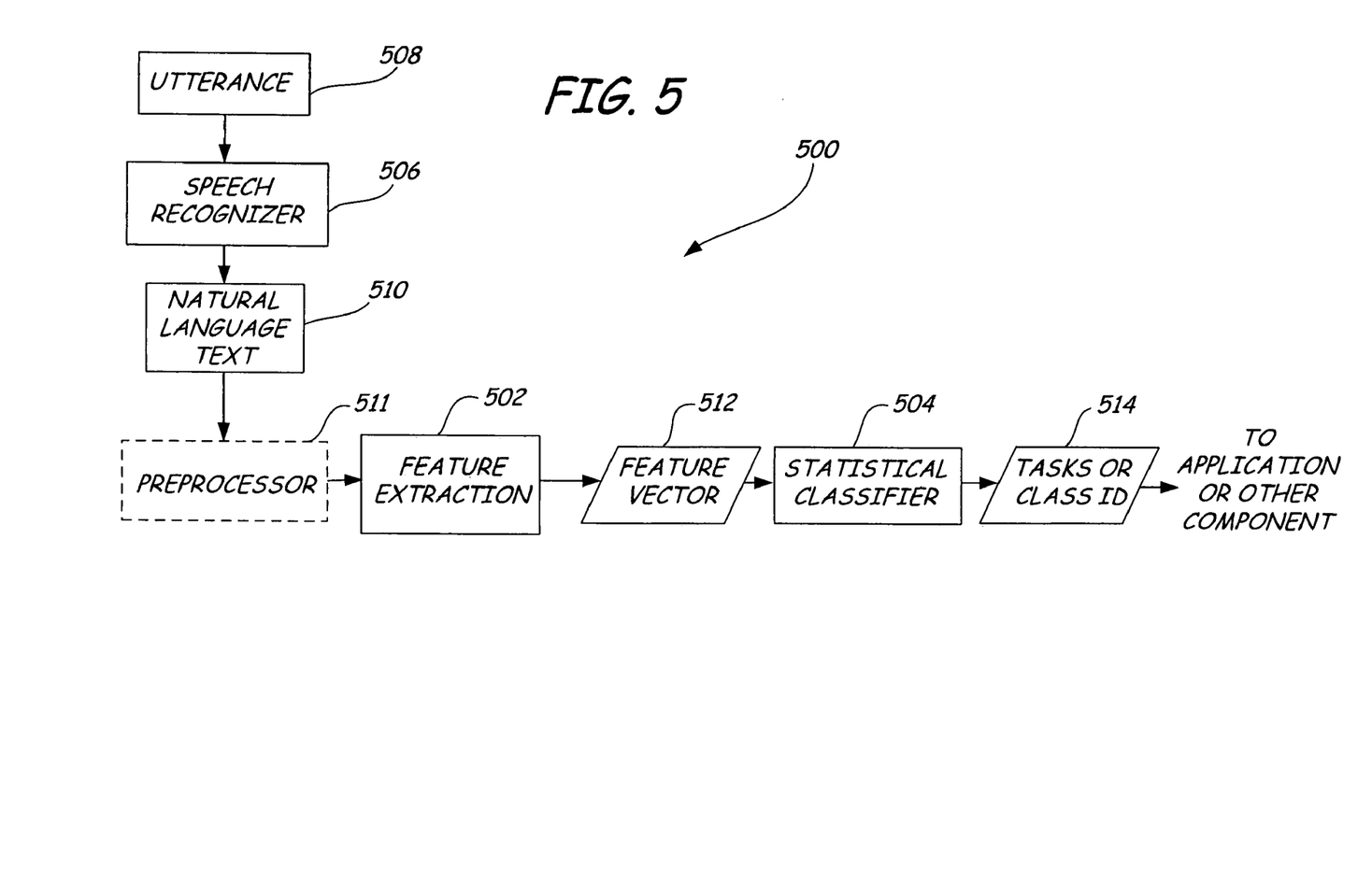
FIG. 5 is block diagram illustrating broad aspects of speech utterance classification using a statistical classifier.

FIG. 5 is a block diagram of a portion of a natural language interface 500 in which the present inventions can be utilized. System 500 includes a feature selection component 502 and a statistical classifier 504. System 500 can also include optional speech recognition engine 506 and optional preprocessor 511. Where interface 500 is to accept speech signals as input, it includes speech recognizer 506. However, where interface 500 is simply to receive textual input, speech recognizer 506 is not needed. Also, preprocessing is optional as described above. The present discussion proceeds with the assumption that speech recognizer 506 and preprocessor 511 are both present. However, it should be understood that they need not be present in other situations, such as when other natural language communication modes can be used, e.g. handwriting or other modes. In such cases, suitable recognition components, such as handwriting recognition components, can be used.

In order to perform task classification, system 500 first receives an utterance 508 in the form of a speech signal that represents natural language speech spoken by a user. Speech recognizer 506 performs speech recognition on utterance 508 and provides, at its output, natural language text 510. Text 510 is a textual representation of the natural language utterance 508 received by speech recognizer 506. Speech recognizer 506 can be any known speech recognition system, which performs speech recognition on a speech input.

Natural language text 510 can optionally be provided to preprocessor 511 for preprocessing and then to feature selection component 502. Feature selection component 502 identifies features in natural language text 510 (or in each text 510 in the list of results output by the speech recognizer) and outputs feature vector 512 based upon the features identified in text 510 as described above. Briefly, feature selection component 502 identifies features in text 510 that can be used by statistical classifier 504.

Statistical classifier 504 receives feature vector 512 and classifies the feature vector into one or more predefined classes or tasks. Statistical classifier 502 outputs a task or class identifier 514 identifying the particular task or class to which statistical classifier 504 has assigned feature vector 512. Task or class identifier 514 corresponds to the particular class or task to which the natural language input (utterance 508 or natural language text 510) corresponds. Task or class identifier 514 is provided to an application or other component that can take action based on the identified task. For example, if a user's request relates to an operating system problem, identifier 514 can cause the request to be forwarded to a technician specializing in operating systems. Of course, other tasks or classes are contemplated as well.

Figure 6:
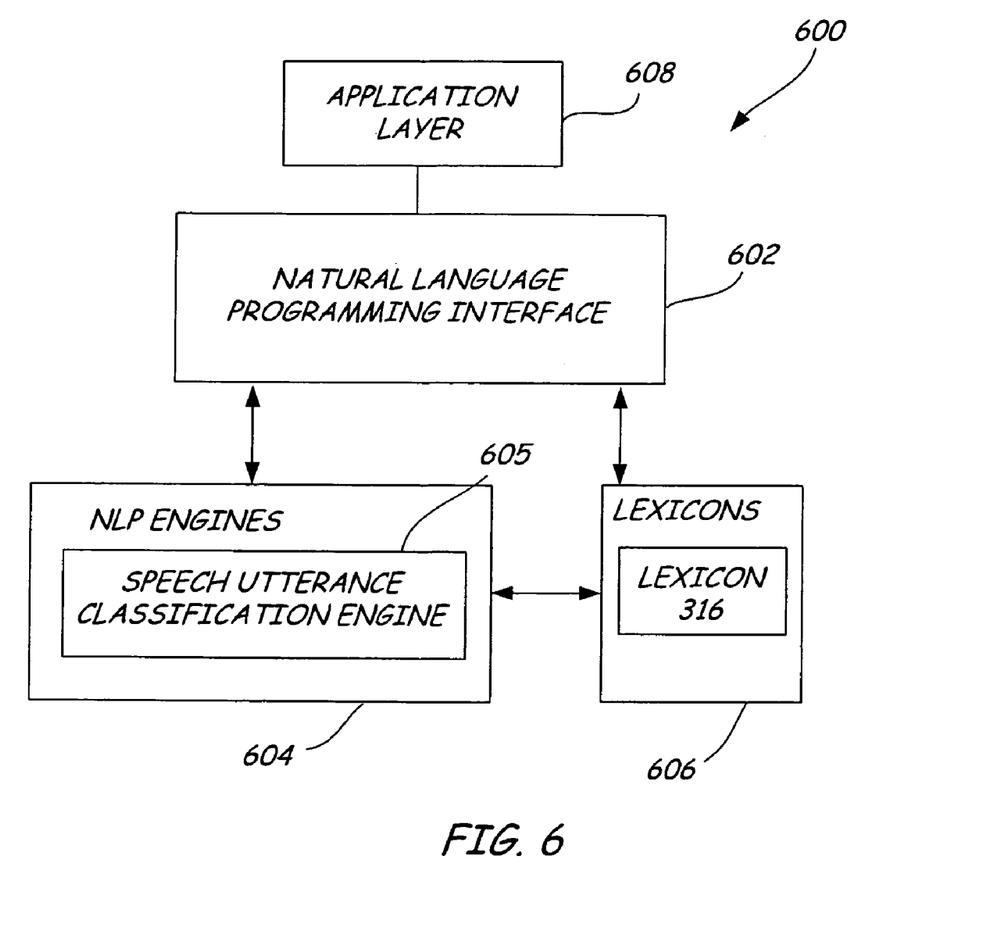
FIG. 6 is a block diagram illustrating a natural language processing system having a speech utterance classification engine.

FIG. 6 is a block diagram illustrating an environment for implementing embodiments of the present inventions. Natural language processing system 600 includes natural language programming interface 602, natural language processing (NLP) engines 604, and associated lexicons 606. FIG. 6 also illustrates that programming interface 602 interacts with an application layer 608 that includes application programs. Such application programs can be natural language processing applications, which require access to natural language processing services that can be referred to as a Linguistic Services Platform or "LSP".

Programming interface 602 exposes elements (methods, properties and interfaces) that can be invoked by application layer 608. The elements of programming interface 602 are supported by an underlying object model such that an application in application layer 608 can invoke the exposed elements to obtain natural language processing services.

In order to do so, an application in layer 608 can first access the object model that exposes interface 602 to configure interface 602. The term "configure" is meant to include selecting desired natural language processing features or functions. For instance, the application may wish to have speech utterance and/or text queries performed. If so, speech utterance and/or text query features can be selected when configuring interface 602. Similarly, the application may wish to have speech recognition, word breaking, or language auto detection performed as well as any of a wide variety of other features or functions. Those features can be selected in configuring interface 602 as well.

Once interface 602 is configured, application layer 608 may provide natural language in the form of speech signals or text, to be processed to interface 602. Interface 602, in turn, can break the text into smaller pieces and access one or more natural language processing engines 604 to perform natural language processing on the input text.

In some embodiments of the present inventions, natural language processing engines 604 comprises speech utterance classification engine 605, which performs natural language processing by classifying input speech and/or text in accordance with statistical classifier 304 illustrated in FIG. 3.

Results of the natural language processing, for example, task or class ID 514 illustrated in FIG. 5 can be provided back to the application in application layer 608 through programming interface 602 or used to update lexicons 606 discussed below.

Interface 602 or NLP engines 604 can also utilize lexicons 606. Lexicons 606 can be updateable or fixed. System 600 can provide core lexicon 606 so additional lexicons are not needed. However, interface 602 can also expose elements that allow applications to add customized lexicons 606. For example, if an application is directed to query or help systems that utilize speech utterance classification engine 605, a customized lexicon such as lexicon 316 also illustrated in FIG. 3 can be a customized lexicon having, e.g. content words commonly found in user queries for the particular system. For example, in a computer help desk system discussed above, a word such as "printer," "operating system," or "crashed" would be found in the customized lexicon. Of course, other lexicons can be added as well. In addition, interface 602 can expose elements that allow applications to add notations to the lexicon so that when results are returned from a lexicon, the notations are provided as well, for example, as properties of the result.

Figure 7:
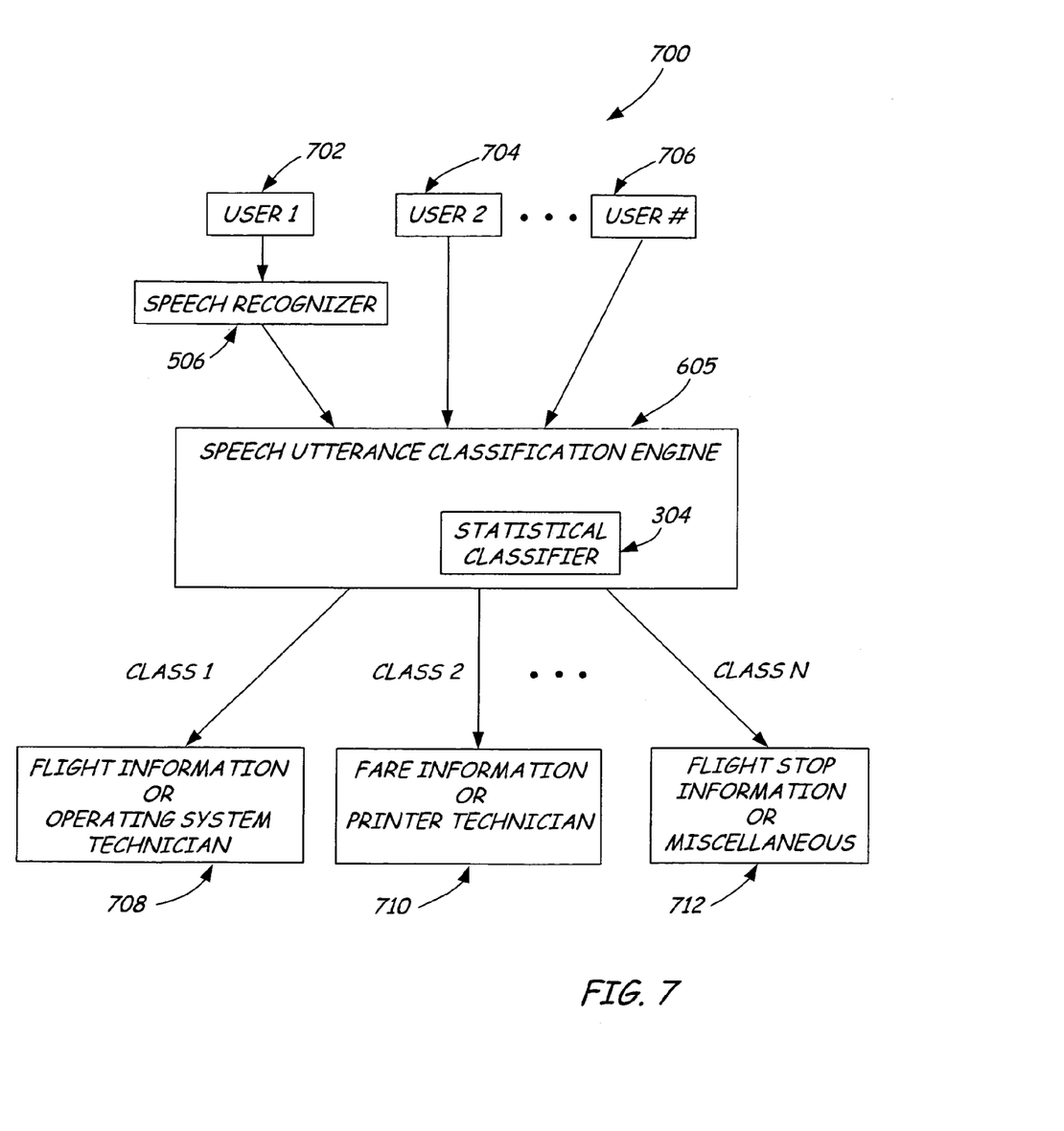
FIG. 7 is a block diagram illustrating a speech and text query system having a speech utterance classification engine.
Figure 8:
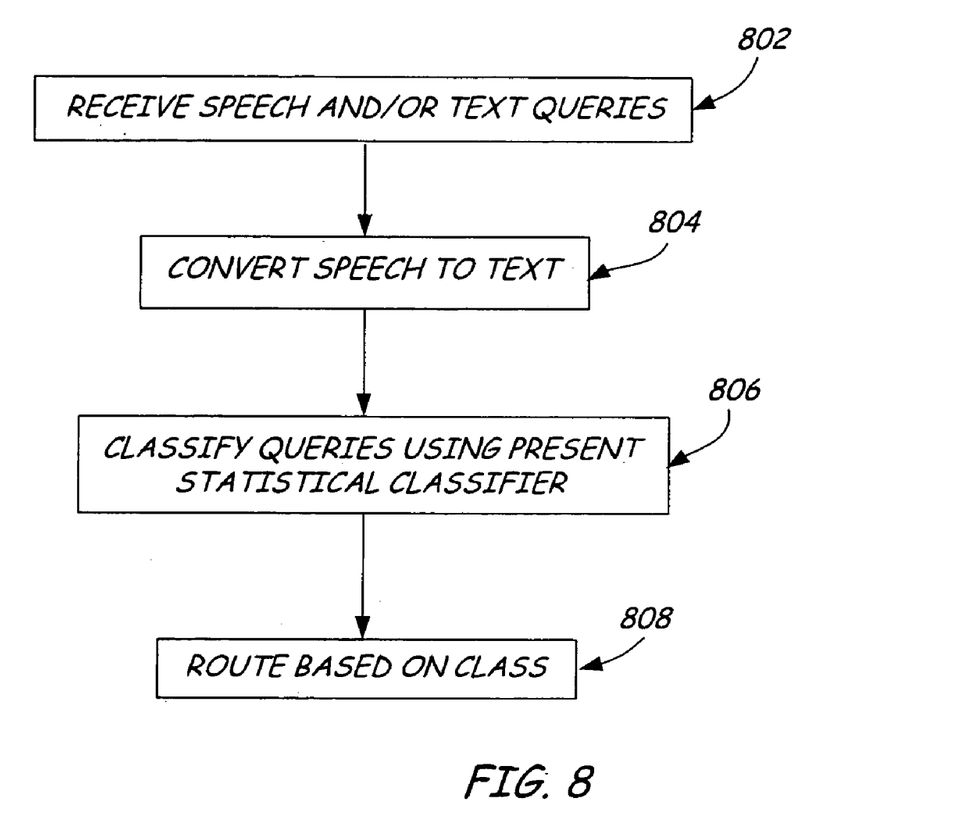
FIG. 8 illustrates a method of speech and text classification.

FIG. 7 illustrates a system of using a speech utterance classification engine. System 700 is a natural language processing system that comprises speech utterance classification engine 605 also illustrated in FIG. 6. FIG. 8 illustrates a method of classifying speech utterances using a system such as system 700. At step 802, speech utterance classification engine 605 receives queries from a plurality of users herein illustrated as users 702, 704, 706. It is contemplated that the number of users would be relatively large such as users using a query or information retrieval system over the Internet or employees using a computer help desk over a local area network.

At step 804, user input in the form of speech input such as received from user 1 indicated at 702 is converted into text using speech recognizer 506 (also illustrated in FIG. 5). Queries received from user 2 and user # illustrated as 704 and 706, respectively, can be received as text input. At step 806, speech utterance classification engine 605 utilizes statistical classifier 304 to classify the input queries into different classes. At step 808, queries are routed based on class as indicated at 708, 710, 712. For example, a user requesting information such as flight, fare, or flight stop information can have appropriate information retrieved. A user requesting help with a operating system, printer, or miscellaneous computer problem can receive assistance from an appropriate technician.

Experiments

The statistical classifier constructed in accordance with the present methods has been used for the Air Travel Information Systems (ATIS) domain. For ATIS speech utterance and text classification, the method improves the performance of a similar classifier trained using maximum likelihood techniques. The new training method achieves 40% relative reduction in class error rate over the standard (maximum likelihood) training method.

Although the present invention has been described with reference to particular embodiments, workers skilled in the art will recognize that changes may be made in form and detail without departing from the spirit and scope of the invention.

What is claimed is:

1. A method of constructing a statistical classifier that classifies sentences having words into classes, comprising:
receiving, in memory accessible by a computer processor, labeled training data comprising text sentences labeled by class;
calculating, using the computer processor, an initial class probability parameter $\theta_y$ value for each class y based on the number of training data sentences having the corresponding class label;
constructing a set of binary valued feature vectors for sentences in the training data, each set of feature vectors corresponding to a class label, each feature vector corresponding to a sentence, each feature corresponding to a word k;
calculating, using the computer processor, initial word/class probability parameter $\theta_{ky}$ values based on training data feature vectors for each class y;
calculating, using the computer processor, initial word/class improbability parameter $\overline{\theta}_{ky}$ values for the training data where $\overline{\theta}_{ky} = 1 - \theta_{ky}$; and
constructing and outputting a statistical classifier of parameterized probability values of all classes jointly given sentence x, and wherein constructing a statistical classifier comprises iteratively re-estimating initial parameters $\theta_{ky}$, $\overline{\theta}_{ky}$ without recalculating $\theta_y$, using the computer processor.

2. The method of claim 1, wherein constructing a statistical classifier comprises applying smoothing to parameters $\theta_{ky}$ and $\overline{\theta}_{ky}$, which comprises calculating an interpolation weight λ for each class y based on sentence count #.

3. The method of claim 2, wherein applying smoothing comprises determining a weight α based on line search.

4. The method of claim 2, wherein constructing a statistical classifier further comprises applying convergence speed-up.

5. The method of claim 1, and wherein constructing binary valued feature vectors comprises:
accessing a word lexicon to determine whether words are in a lexicon; and
constructing each feature vector based on assigning values of 1 and 0 to words in the corresponding sentence based on whether the feature words are in or not in the lexicon, respectively.

6. The method of claim 1, and further comprising receiving unlabeled test data T and constructing feature vectors for sentences in the test data.

7. The method of claim 1, and further comprising calculating parameters $\theta_{ky}$ and $\overline{\theta}_{ky}$ based on the feature vectors of the training data.

8. The method of claim 1, wherein constructing a statistical classifier comprises iteratively re-estimating two of the initial parameters $\theta_{ky}$, $\overline{\theta}_{ky}$.

9. The method of claim 8, wherein constructing a statistical classifier comprises maximizing parameterized conditional likelihood H over the training data T where H is the product of conditional probabilities of class given a sentence in the training data T.

10. The method of claim 1, wherein constructing a statistical classifier comprises maximizing parameterized conditional likelihood H over the training data by iteratively recalculating at least one of the parameters $\theta_{ky}$, $\overline{\theta}_{ky}$ based on applying the rational function growth transform.

11. A computer readable storage medium including instructions readable by a computer which, when implemented, cause the computer to construct and output a statistical classifier comprising:
receiving labeled training data categorized into classes;
calculating an initial class probability $\theta_y$ for sentences on the training data;
calculating an initial probability $\theta_{ky}$ based on probability that a word k is in class y;
calculating an initial improbability $\overline{\theta}_{ky}$ based on improbability that word k is in class y; and
maximizing conditional class likelihood H over the training data by iteratively recalculating the parameters $\theta_{ky}$, $\overline{\theta}_{ky}$ without recalculating $\theta_y$, over all classes jointly to construct the statistical classifier.

12. The computer readable storage medium of claim 11, wherein calculating an initial probability $\theta_y$ comprises constructing binary valued feature vectors for sentences in the training data, the binary values being 0 or 1 based on whether words are in a lexicon.

13. The computer readable storage medium of claim 11, and further comprising performing smoothing comprising calculating an interpolation weight λ for each class.

14. The computer readable storage medium of claim 11, and further comprising constructing binary valued feature vectors of sentences in the training data.

15. The computer readable storage medium of claim 14, and further comprising iteratively re-estimated parameters $\theta_{ky}$ and $\overline{\theta}_{ky}$ based on the feature vectors of the sentences in the training data.

16. A computer readable storage medium comprising:
a speech recognizer converting multiple speech signals to text; and
a speech utterance classification engine comprising a Naïve Bayes classifier constructed using conditional maximum likelihood estimations wherein a probability $\theta_{ky}$ that a word k is in class y and an improbability $\overline{\theta}_{ky}$ are iteratively recalculated, and wherein a class probability $\theta_y$ is not reiteratively recalculated, over all classes jointly.

17. The computer readable storage medium of claim 16, wherein the speech utterance classification engine uses convergence speed-up.

18. A computer readable storage medium having stored thereon computer readable instructions which, when read by the computer comprise:
- receiving a natural language input through an application programming interface (API);
- providing the natural language input to one or more natural language processing (NLP) components, including a speech utterance classification engine to perform speech utterance and text classification analysis operations on the natural language input, the speech utterance classification engine comprising a Naïve Bayes classifier constructed using conditional maximum likelihood estimations and rational function growth transforms with smoothing and convergence speed-up wherein a probability $\theta_{ky}$ that a word k is in class y and an improbability $\bar{\theta}_{ky}$ are iteratively recalculated, and wherein a class probability $\theta_y$ is not reiteratively recalculated, over all classes jointly, the speech utterance and text classification analysis operations selected from a plurality of different possible NLP analysis operations selectable through the API; and
- returning analysis results from the named entity operations through the API.

* * * * *

UNITED STATES PATENT AND TRADEMARK OFFICE
CERTIFICATE OF CORRECTION

PATENT NO. : 7,624,006 B2  Page 1 of 1
APPLICATION NO. : 10/941399
DATED : November 24, 2009
INVENTOR(S) : Ciprian Chelba et al.

It is certified that error appears in the above-identified patent and that said Letters Patent is hereby corrected as shown below:

In column 16, line 37, in Claim 11, delete "$\theta_{ky}$" and insert -- $\overline{\theta_{ky}}$ --, therefor.

Signed and Sealed this
Fifteenth Day of February, 2011

David J. Kappos
*Director of the United States Patent and Trademark Office*